United States Patent [19]
Langlet et al.

[11] Patent Number: 5,976,483
[45] Date of Patent: Nov. 2, 1999

[54] METHOD OF PREPARING DINITRAMIDIC ACID AND SALTS THEREOF

[75] Inventors: Abraham Langlet, Stockholm; Henric Östmark, Huddinge; Niklas Wingborg, Stockholm, all of Sweden

[73] Assignee: Forsvarets Forskningsanstalt, Stockholm, Sweden

[21] Appl. No.: 08/983,462

[22] PCT Filed: Jul. 26, 1996

[86] PCT No.: PCT/SE96/00976

§ 371 Date: Jan. 13, 1998

§ 102(e) Date: Jan. 13, 1998

[87] PCT Pub. No.: WO97/06099

PCT Pub. Date: Feb. 20, 1997

[30] Foreign Application Priority Data

Aug. 8, 1995 [SE] Sweden .................................. 9502783
Sep. 26, 1995 [SE] Sweden .................................. 9503326

[51] Int. Cl.⁶ ..................................................... C01B 21/20
[52] U.S. Cl. ............................................. 423/385; 423/387
[58] Field of Search ...................................... 423/385, 387

[56] References Cited

U.S. PATENT DOCUMENTS

| | | | |
|---|---|---|---|
| 2,752,225 | 6/1956 | Revallier | 423/387 |
| 5,198,204 | 3/1993 | Bottaro et al. | 423/385 |
| 5,254,324 | 10/1993 | Bottaro et al. | 423/263 |
| 5,316,749 | 5/1994 | Schmitt et al. | 423/385 |
| 5,415,852 | 5/1995 | Schmitt et al. | 423/385 |

OTHER PUBLICATIONS

Hatano et al., *Europyro*, 1995, New synthetic method and properties of ammonium dinitramide (AND), pp. 23–26.

*Primary Examiner*—Wayne Langel
*Attorney, Agent, or Firm*—Jacobson, Price, Holman & Stern, PLLC

[57] ABSTRACT

The invention relates to a method of preparing dinitramidic acid $HN(NO_2)_2$ and salts thereof having the formula $M^{+n}(^-N(NO_2)_2)_n$, wherein M is a metal cation or a nitrogen-containing cation and n=1–3. The dinitramide salt can be used as oxidiser in solid propellants. Dinitramidic acid is prepared by nitration of a compound selected from a group consisting of $NH_2NO_2$, $NH_4NH_2CO_2$; $NH_2SO_3H$, $NH(SO_3H)_2$, $N(SO_3H)_3$, and its salts with metal cations or organic cations, e.g. $NH(SO_3NH_4)_2$, and other products formed when ammonia is reacted with sulphuric trioxide, with a common nitrating acid such as nitric acid/sulphuric acid or nitric acid/acetic anhydride. The invention also relates to a method of preparing dinitramide salt, comprising neutralisation of dinitramidic acid with a neutralising agent, e.g. ammonia, and recovery of the dinitramide salt from a mixture of salts formed in the neutralisation. An aqueous solution of the salt mixture is passed through a column containing an adsorbing agent which adsorbs the dinitramide salt and is selected from a class consisting of activated carbon, silica gel and zeolites. The dinitramide salt is eluted with an elution agent consisting of hot water and/or a polar organic solvent, e.g. acetone, acetonitrile, 2-propanol and other lower alcohols and mixtures thereof.

22 Claims, No Drawings

METHOD OF PREPARING DINITRAMIDIC ACID AND SALTS THEREOF

The invention relates to the preparation of dinitramidic acid and salts thereof. More specifically, the invention concerns a new method of preparing, by inexpensive nitration of suitable initial compounds, dinitramidic acid which constitutes an intermediate product in the preparing of dinitramide salts. The invention also relates to a method in the preparation of dinitramide salts by neutralisation of dinitramidic acid with suitable compounds. The invention particularly concerns a new method of recovering the dinitramide salt from the mixture of reaction products that is obtained in the neutralisation.

Dinitramide salts can be used as oxidisers in solid propellants.

In solid rocket propellants, use is made of mainly ammonium perchlorate or potassium perchlorate as oxidisers. The use of propellants containing chlorine, however, causes a number of problems, among other things from the viewpoint of air pollution. A serious drawback in military applications is that the chlorine content causes smoke that may be detected with radar and, in case of high humidity of the air, can also be seen as clear white smoke.

Oxidisers free from chlorine thus are desirable. The most suitable substance for replacing the perchlorate oxidisers is ammonium dinitramide (ADN) and other salts of dinitramidic acid. Dinitramide salts and methods for preparing the same are disclosed in WO 91/19669 and WO 91/19670. A further method of preparation is disclosed in WO 93/16002.

In the previously described syntheses of the dinitramidic acid, use is made of very strong oxidising systems of the type $N_2O_5$ or $NO_2BF_4$. These are very expensive and are not suitable for large-scale industrial preparation of oxidisers.

One object of the present invention is to provide a method of preparing dinitramide salts, which is suitable for large-scale production.

A further object is to prepare, from suitable initial substances, dinitramidic acid by a common nitration with nitrating acid, such as nitric acid/sulphuric acid, or a corresponding inexpensive nitration system.

One more object is to provide a simple method for separation of dinitramide salt from other inorganic salts in connection with the production of the salt by neutralisation of dinitramidic acid.

The invention relates to the preparation of dinitramidic acid, $HN(NO_2)_2$ and salts thereof of the formula $M^{+n}(^-N(NO_2)_2)_n$, wherein M is a metal cation or a nitrogen-containing cation and n=1–3, by neutralisation of the acid with a neutralising agent and recovery of the dinitramide salt from the resultant reaction mixture.

According to the invention, dinitramidic acid is prepared by nitration of a compound selected from a group consisting of $NH_2NO_2$, $NH_4NH_2CO_2$; $NH_2SO_3H$, $HN(SO_3H)_2$, $N(SO_3H)_3$, and its salts with metal cations or organic cations, for instance $NH(SO_3NH_4)_2$, as well as other products that are formed when ammonia is reacted with sulphur trioxide, the nitration being carried out with a common nitrating acid. By common nitrating acid is meant nitrating acid mixtures such as nitric acid/sulphuric acid ($HNO_3$/$H_2SO_4$), nitric acid/oleum ($HNO_3$/$H_2SO_4$/$SO_3$), nitric acid/sulphur trioxide ($HNO_3$/$SO_3$), nitric acid/perchloric acid ($HNO_3HClO_4$), nitric acid/phosphoric acid ($HNO_3$/$H_3PO_4$), nitric acid/diphosphorous pentoxide ($HNO_3$/$P_2O_5$), nitric acid/acetic acid, nitric acid/acetic anhydride, nitric acid/trifluoroacetic acid and nitric acid/trifluoroacetic anhydride. $HNO_3$/$H_2SO_4$ is especially preferred.

No aprotic solvent for the nitrating agent is required when nitrating with the nitrating acids according to the invention, which facilitates the subsequent processing.

It is preferred to use as initial substances salts which contain a cation of the same type as the cation of the neutralising agent which is later used for neutralising the formed dinitramidic acid to dinitramide salt. The number of ionic species in the reaction mixture can be minimised in this manner, and the processing of the dinitramide salt is facilitated. Particularly preferred are ammonium and potassium salts of the initial substances, and the fact that the neutralisation after nitrating is carried out with $NH_3$ and KOH, respectively, which results in an advantageous preparation path direct to the products ammonium dinitramide (ADN) and potassium dinitramide (KDN), respectively.

In the nitration, the nitrating acid is cooled to a low temperature, for instance −25° C. or below, and the initial substance, for instance a sulfamic acid salt, is added during vigorous stirring. The reaction is carried out in a reaction vessel, where a high dissipation of heat can be ensured in view of the reaction mixture becoming relatively viscous as the reaction proceeds. In the reaction, dinitramidic acid of the formula $HN(NO_2)_2$ is formed. The acid is not stable in acid environment, and the acid content of the reaction mixture rises to a maximum so as to sink if the reaction is not interrupted at the correct point of time. The acid content is checked as the reaction proceeds by samples being taken, diluted and examined by UV spectroscopy. The dinitramidic acid has a maximum absorbance of 285 nm. The reaction is interrupted by the reaction mixture being diluted with water during intense cooling, for instance by pouring it into an ice bath. In direct connection with this preparation, the acid is neutralised to a dinitramide salt of the general formula $M^{+n}(^-N(NO_2)_2)_n$, wherein M is a metal cation or a nitrogen-containing cation and n=1–3.

The nitrating reaction is schematically illustrated by the following formula for nitration of the potassium salt of the sulfamic acid.

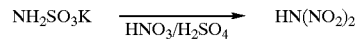

As neutralising agent, use can be made of ammonia $NH_3$, hydrazine $N_2H_4$, a primary amine $RNH_2$, a secondary amine $RR'NH$ or a salt AX, whe rein A is a metal ion or a nitrogen-containing cation and X is fluoride, chloride, hydroxyl, carbonate, alkoxide or carbonyl anion. R and R' in the amines can be the same or different and constitute alkyl group s having 1–6 carbon atoms.

The respective neutralising reactions can be illustrated by the following reaction formulae:

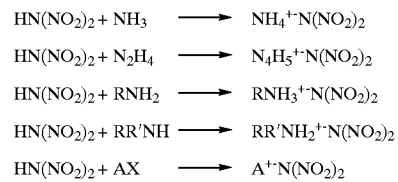

Metal ions which may constitute A in the salt AX include monovalent, divalent and trivalent metal ions which form soluble salts with fluoride, chloride, hydroxyl, carbonate, alkoxide or carbonyl anions. Typical metals include alkali metals Li, Na, K, Rb and Cs; alkaline earth metals Ca, Ba, Sr and Mg; group Ib metals Cu, Ag and Au; group llb metals Zn, Cd and Hg; group III metals Al, Sc, Y, Ga, ln and elements 57–71 of the Lantanide series; group IV metals Ti, Zr, Hf, Ge and Sn; group V metals V, Nb and Ta; group VI metals Cr, Mo and W; group VIIa metals Mn, Tc and Re; and group VIII metals Fe, Co, Ni, Ru, Rh, Pd, Os, Ir and Pt. Li, Na, K, Be and Mg are preferred metals.

When A is a nitrogen-containing cation, it may consist of an ion of the formula $(R''_kH_mN_n)^{+z}$, n=1–8, k=0 to 3+n, z=1 to n, m=3+n−k and R'' is a straight or branched alkyl having 1–6 carbon atoms. Examples of such ions include $NH_4^+$, $CH_3NH_3^+$, $(CH_3)_2NH_2^+$, $(CH_3)_3NH^+$, $(CH_3)_4N^+$, $C_2H_5NH_3^+$, $(C_2H_5)_2NH_2^+$, $(C_2H_5)_3NH^+$, $(C_2H_5)_4N^+$, $(C_2H_5)(CH_3)NH_2^+$, $(C_2H_5)(CH_3)_2NH^+$, $(C_2H_5)_2(CH_3)_2N^+$, $(C_3H_7)_4N^+$, $(C_4H_9)_4N^+$, $N_2H_5^+$, $CH_3N_2H_4^+$, $(CH_3)_2N_2H_3^+$, $(CH_3)_3N_2H_2^+$, $(CH_3)_4N_2H^+$, $(CH_3)_5N_2^+$, etc.

A may also consist of a cubane-1,4-bisammonium ion; cubane-1,2,4,7-tetraammonium ion; cubane-1,3,5,7-tetraammonium ion; cubane-1,2,3,4-tetraammonium ion; cubane-1,2,3,4,7-pentaammonium ion; cubane-1,2,4,6,8-pentaammonium ion; guanidium $(C(NH_2)_3^+)$; triamino guanidinium $(C(N_2H_3)_3^+)$; nitronium $(NO_2^+)$; nitrosonium $(NO^+)$ or a 1–10000 nitrogen polymer of ethylene imine.

The neutralisation is preferably carried out directly from the mixture obtained after nitration. When the neutralisation approaches its terminal point, the solution obtains a characteristic green-yellow colour.

The dinitramide salt obtained in neutralisation can be recovered by a plurality of techniques, for instance as described in WO 91/19670.

According to the present invention, it is preferred to separate the dinitramide salt from other inorganic salts formed in neutralisation by contacting an aqueous solution of the mixture with an adsorbing agent which adsorbs the dinitramide salt and is selected among activated carbon, silica gel and zeolites. The dinitramide salt has a higher affinity with adsorption materials such as activated carbon, silica gel and zeolites than the other salts in the mixture. The dinitramide salt can be desorbed with hot water, and/or a polar organic solvent, preferably acetone, 2-propanol or mixtures thereof. Other polar solvents that can be used are, for instance, acetonitrile and lower alcohols, especially methanol and ethanol. The adsorption material is suitably arranged in a column, through which the aqueous solution of the salt mixture is passed. Subsequently, the dinitramide salt can be eluted with hot water and/or a polar organic solvent, for instance acetone, 2-propanol etc. as above, and be recovered by evaporation of the elution agent. Also gradient elution can be applied.

For industrial production of oxidisers for propellants, neutralisation of the dinitramidic acid with ammonia is an attractive process. In addition to ammonium dinitramide, ammonium nitrate and other inorganic salts are formed in this neutralisation. Since ammonium nitrate is soluble in ammonium dinitramide, the preparation thereof in pure condition will be difficult while using precipitating techniques. Separation by the adsorption process according to the invention is then very advantageous and is well suited for large-scale industrial production of ammonium dinitramide.

It should be noted that this processing method can be used also in the cases where the dinitramidic acid is prepared by other nitrating techniques, for instance as described in WO 91/19669, WO 91/19670, WO 93/16002 or Europyro 1995, pp 25–26, Hatano H et al: New synthetic method and properties of ammonium dinitramide (ADN).

Another technique of processing KDN from a reaction mixture neutralised with KOH is to vacuum-concentrate the mixture to a dry powder and extract the powder with acetone. Subsequently, 2-propanol is added to the acetone solution and the mixture is evaporated. First, acetone dissipates and KDN having low solubility in 2-propanol precipitates and can be separated from the solution.

ADN can be prepared from KDN by an aqueous solution of KDN being mixed with an aqueous solution of $(NH_4)_2SO_4$, whereby a white precipitate of $K_2SO_4$ is formed. 2-propanol is added to the mixture and the $K_2SO_4$ precipitate is separated. The solution is evaporated, and ADN precipitates. If necessary, the product from the evaporation can be dissolved in 2-propanol and be poured into a non-polar solvent, e.g. petroleum ether, whereby ADN precipitates and can be separated.

ADN can also be prepared from KDN by mixing KDN and $(NH_4)_2SO_4$ in 2-propanol and heating the mixture, optionally reflux boiling the mixture until the ammonium sulphate has dissolved. The solution is then cooled, whereby $K_2SO_4$ precipitates and is separated. The remaining solution is concentrated by evaporation, and the concentrate is poured into a non-polar solvent, e.g. petroleum ether. ADN precipitates and can be separated.

The invention will be described below by means of Examples.

EXAMPLE 1

Salt of Sulfamic Acid

Sulfamic acid $H_2NSO_3H$ was neutralised with KOH. 70.35 g sulfamic acid were suspended in 50 ml water. 44 g potassium hydroxide were dissolved in as small an amount of water as possible (50 ml) and added to the suspended sulfamic acid. The new solution was neutral (pH 7±1). 70 ml of the neutral solution were poured into 100 ml ethanol. The potassium salt of the sulfamic acid precipitated. The salt was filtered off on a paper filter, washed with alcohol and dried in a hot cabinet at 70° C. After drying, the salt was ground to a very fine powder in a porcelain mortar.

Nitration 45 ml fuming nitric acid and 16 ml sulphuric acid (95%) were mixed in a narrow, high bowl of a diameter of about 5 cm. The nitration mixture was cooled to about −30° C. with a mixture of dry ice and dichloroethane. The reaction vessel (bowl) was fitted with a propeller agitator. The potassium salt of the sulfamic acid was now added in small portions of 0.5–1 g during very powerful agitation. The viscosity increased significantly as the reaction proceeded when $KHSO_4$ precipitated. The amount of dinitramidic acid formed was checked by taking off 1 ml of the solution, diluting it to 1000 ml and examining it by means of a UV spectrometer. The acid has a maximum absorbance of 285 nm. Since the acid is not stable in acid environment, the acid content of the reaction mixture begins to decrease after a certain reaction time. By UV spectroscopy, a suitable point of time for interrupting the reaction so as to obtain an optimum yield of the acid can be determined. In this manner, 17 g of the potassium salt were added, and the reaction was interrupted after about 20 min. The reaction mixture was poured into a bath containing 150 g of crushed ice and 150 ml of water, and the neutralisation was immediately initiated.

Neutralisation

A solution of cold potassium hydroxide was added to the bath during powerful agitation. During adding, the ice bath was cooled with dry ice and dichloromethane. The temperature was not allowed to rise above 0° C. When the neutralisation approached its terminal point, the solution obtained a characteristic green-yellow colour. The neutralisation continued until the solution was weakly basic.

The reaction mixture was roller-evaporated during vacuum pumping to a completely dry powder. The dry powder was extracted with 10 ml acetone. 100 ml 2-propanol were added to the acetone solution, and the mixture was roller-evaporated. Acetone dissipates first, and potassium dinitramide (KDN) having a low solubility in 2-propanol precipitated. The crystals were filtered off and dried in a hot cabinet at 70° C. 10.7 g KDN were obtained, i.e. a 60% yield.

Preparation of ADN from KDN 0.5 g KDN was dissolved in 1 ml water and 0.5 g $(NH_4)_2SO_4$ was dissolved in 1 ml water. The solutions were mixed with each other and a white precipitate of $K_2SO_4$ formed. 10 ml 2-propanol were added. $K_2SO_4$ was filtered off, and the solution was roller-evaporated. The slightly moist product from the roller-evaporation was dissolved in 2-propanol and poured into petroleum ether, whereby ADN precipitated. The precipitate was filtered off and dried for 3 days at 50° C.

Alternative Preparation of ADN from KDN 3 g KDN were weighed into a 250 ml E flask with a magnetic agitator. 3 g $(NH_4)_2SO_4$ were weighed in, ground to a fine powder in a mortar and poured into the E flask. 100 ml 2-propanol were added. The reaction mixture was heated during agitation until the ammonium sulphate had dissolved. The solution was cooled, whereby $K_2SO_4$ precipitated. $K_2SO_4$ was filtered off. The remaining solution was concentrated by roller-evaporation, and the concentrated organic phase was poured into petroleum ether. ADN precipitated as fine needles that were filtered off and dried in a hot cabinet at 50° C.

EXAMPLE 2

The ammonium salt of the sulfamic acid, $NH_2SO_3NH_4$, was nitrated in the same manner as described in Example 1. When the content of dinitramidic acid was established, by UV spectroscopy, to have reached a maximum level, the reaction mixture was poured into a bath of crushed ice and water. Ammonia was bubbled through the bath during cooling of the bath with dry ice and dichloromethane. The neutralisation continued until the solution was weakly basic. A 40 cm elution column with a sintered sheet of glass in the bottom and an inner diameter of 3 cm was filled with activated carbon up to 30 cm. 300 ml deionised water was allowed to flow through the column. 150 ml of the solution neutralised with $NH_3$ was poured on the column. The column was washed with 3×150 ml cold water. The ammonium dinitramide was desorbed with 4×50 ml acetone. The acetone solution was evaporated and ADN precipitated. The purity of the product was determined by DSC. No impurities could be noticed.

EXAMPLE 3

Nitration

The potassium salt of the sulfamic acid was nitrated with 45 ml fuming nitric acid and 16 ml oleum. Otherwise, the procedure was the same as in Example 1. The potassium salt of the sulfamic acid was added in small portions of 0.5–1 g during very powerful agitation, and the amount of dinitramidic acid formed was checked by taking off 1 ml of the solution, diluting it to 1000 ml and examining it by means of a UV spectrometer. 16 g of the potassium salt were added, and the reaction was interrupted after about 20 min. The reaction mixture was poured into a bath containing 150 g crushed ice and 150 ml water, and the neutralisation was immediately initiated.

Neutralisation

A solution of cold potassium hydroxide was added to the bath during powerful agitation. During adding, the ice bath was cooled with dry ice and dichloromethane. The temperature was not allowed to rise above 0° C. The neutralisation continued until the solution was weakly basic.

The reaction mixture was roller-evaporated during vacuum pumping to a completely dry powder. The dry powder was extracted with 10 ml acetone. 100 ml 2-propanol were added to the acetone solution, and the mixture was roller-evaporated. Acetone dissipates first, and potassium dinitramide (KDN) having a low solubility in 2-propanol precipitated. The crystals were filtered off and dried in a heat cabinet at 70° C. 8.5 g KDN were obtained, i.e. a yield of 50%.

EXAMPLE 4

A typical method according to the invention for preparing KDN will be described below.

1 part by weight of potassium sulfamate is added during vigorous agitation to a nitrating acid consisting of fuming nitric acid and 15–40% by weight, preferably 28–32% by weight, of concentrated sulphuric acid (95%). The amount of nitrating acid constitutes 3–6 parts by weight, preferably 4.0–4.5 parts by weight. The potassium sulfamate is added in small portions during a space of time of 5–10 min. and during cooling of the reaction mixture. The temperature is not allowed to rise above −25° C. and is preferably kept at −30° C. to −40° C. The reaction mixture is then kept at a temperature of −30° C. to −40° C. for 20–30 min. until a maximum concentration of dinitramidic acid is obtained (UV checking).

After completion of the nitration, the mixture is poured at about −40° C. into 4–6 parts by weight of water during mixing. The diluted solution is neutralised with KOH (aqueous) to pH=7.0±1.0. KDN is separated from the neutralised solution by two alternative methods.

a) The neutralised solution is evaporated to dryness, and KDN is extracted with acetone (2.0–4.0 parts by volume, preferably 2.8–3.2 parts by volume per 1 part of potassium sulfamate). The acetone extract, which contains pure KDN only, is concentrated by evaporation, and KDN is precipitated by adding 2-propanol. KDN is removed by filtration and dried at 40–60° C. in vacuum for 4–6 h.

b) The neutralised solution containing KDN, $KNO_3$ and $K_2SO_4$ is pumped through a column (glass, stainless steel etc.) filled with activated carbon. All KDN is adsorbed by the carbon and is then washed out with hot water. The aqueous solution of KDN is concentrated by evaporation to 50–60% salt concentration. KDN is precipitated from the solution by adding 2-propanol.

In the same manner as described in Example 1, ADN can be prepared from recovered KDN.

In repeated preparation of KDN according to this method, yields of 45–60% were obtained. The melting point of the recovered product was measured to be 132° C.

EXAMPLE 5

Potassium sulfamate was nitrated with a nitrating acid consisting of fuming nitric acid and 30% by weight oleum $(H_2SO_4+SO_3)$. 4 parts by weight of nitrating acid per 1 part by weight of potassium sulfamate were used. Otherwise, the method was carried out in accordance with Example 4 and KDN was separated from the neutralised solution according to Example 4b. KDN was recovered in a yield of 70%. The method was repeated with nitrating acids containing different contents of oleum in the range of 15–40% by weight.

EXAMPLE 6

Potassium sulfamate was nitrated with a nitrating acid consisting of fuming nitric acid and 28% by weight of pure $SO_3$. 4.5 parts by weight of nitrating acid per 1 part by weight of potassium sulfamate were used. Otherwise, the method was carried out in accordance with Example 4–4a, and KDN was recovered in a yield of 68%. The method was repeated with nitrating acids containing different contents of $SO_3$ in the range of 15–40% by weight, and KDN was recovered in yields between 50 and 70%.

EXAMPLE 7

A typical method according to the invention for synthesis of ADN will be described below.

1 part by weight of ammonium sulfamate ($NH_2SO_3NH_4$) is nitrated with 5.5±0.5 parts by weight of nitrating acid as described in Example 4 or 5. The reaction mixture is diluted with water (1:2) and neutralised to pH 7.0±1.0 with concentrated (~25%) ammonia solution.

ADN is separated from the neutralised solution which also contains $NH_4NO_3$ and $(NH_4)_2SO_4$ by adsorption-desorption as described in Example 4b. The aqueous solution from the desorption step, which contains pure ADN, is concentrated by evaporation, and the remaining water (~30–40%) is removed by azeotropic distillation with 2-propanol. ADN is precipitated from the 2-propanol solution with a hydrocarbon (hexane, heptane etc.).

In repeated syntheses according to this method, 0.6–0.7 part by weight of ADN was recovered (~60% yield).

EXAMPLE 8

Synthesis of ADN from ammoniumimido disulphonate—$NH(NH_4SO_3)_2$—ADS. 1 part by weight of ADS was nitrated with 2.53.0 parts by weight of nitrating acid ($HNO_3/H_2SO_4$=72/28% by weight: % by weight) in the same way as described in Example 4. The treatment of reaction mixtures and the separation of ADN were carried out according to that described in Example 7. 0.48 part by weight of ADN was recovered, which corresponds to a yield of 80%.

EXAMPLE 9

The synthesis according to Example 8 was repeated with nitramide—$NH_2NO_2$—as initial substance. 2.5–2.8 parts by weight of nitrating acid ($HNO_3/H_2SO_4$=72/28% by weight: % by weight) were used per 1 part by weight $HN_2NO_2$. 1.6 parts by weight of ADN were recovered, which corresponds to a yield of 80%.

What is claimed is:

1. A method of preparing dinitramide salt, comprising providing an initial compound selected from the group consisting of $NH_2NO_2$, $NH_4NH_2CO_2$, $NH_2SO_3H$, $NH(SO_3H)_2$, $N(SO_3H)_3$, reaction products of ammonia and sulphur trioxide, and salts thereof with metal, ammonium and organic cations;

reacting said initial compound with a nitrating acid mixture selected from the group consisting of nitric acid/sulphuric acid ($HNO_3/H_2SO_4$), nitric acid/oleum ($HNO_3/H_2SO_4/SO_3$), nitric acid/sulphur trioxide ($NHO_3/SO_3$), nitric acid/perchloric acid ($HNO_3/HClO_4$), nitric acid/phosphoric acid ($HNO_3/H_3PO_4$), nitric acid/diphosphorous pentoxide ($HNO_3/P_2O_5$), nitric acid/acetic acid, nitric acid/acetic anhydride, nitric acid/trifluoroacetic acid and nitric acid/trifluoroacetic anhydride, at a temperature of −25° C. or below, to form dinitramidic acid in the reaction mixture; neutralizing said reaction mixture with a neutralizing agent to neutralize said dinitramidic acid and form the corresponding dinitramide salt and recovering said dinitramide salt.

2. The method as claimed in claim 1, wherein said neutralization of the reaction mixture is initiated when the concentration of dinitramidic acid in the reaction mixture has reached an optimal level.

3. The method as claimed in claim 1, further comprising measuring the concentration of dinitramidic acid in the reaction mixture during said reaction by UV spectroscopy.

4. The method as claimed in claim 1, wherein said neutralization of the reaction mixture further comprises diluting said reaction mixture with water before adding said neutralizing agent.

5. The method as claimed in claim 1, wherein said neutralizing agent is selected from the group consisting of ammonia, hydrazine, a primary amine of the formula $RHN_2$, a secondary amine of the formula RR'NH and a salt of the formula AX, wherein R and R' are the same or different alkyl groups having 1–6 carbon atoms, and A is a metal cation or a nitrogen-containing cation, and X is an anion selected from the group consisting of fluoride, chloride, hydroxyl, carbonate, alkoxide and carboxyl.

6. The method as claimed in claim 5, further comprising recovering said dinitramide salt by contacting an aqueous solution of a mixture of salts formed in the neutralization with an adsorbing agent which adsorbs the dinitramide salt, said adsorbing agent being selected from the group consisting of activated carbon, silica gel and zeolites, and desorbing said dinitramide salt from said adsorbing agent with hot water and/or a polar organic solvent.

7. The method as claimed in claim 6, further comprising arranging said adsorbing agent in a column, passing said aqueous solution of the salt mixture through said column, and eluting said dinitramide salt with an elution agent consisting of hot water and/or a polar organic solvent.

8. The method as claimed in claim 7, wherein said dinitramide salt is eluted by gradient elution.

9. The method as claimed in claim 6, wherein said organic solvent is selected from the group consisting of acetone, acetonitrile, 2-propanol and other low carbon alcohols, and mixtures thereof.

10. The method as claimed in claim 1, wherein said initial compound is an ammonium salt, said neutralizing agent is ammonia, and said dinitramide salt is ADN.

11. The method as claimed in claim 10, wherein said initial compound is the ammonium salt of the sulfamic acid.

12. The method as claimed in claim 1, wherein said initial compound is a potassium salt, said neutralizing agent is KOH, and said dinitramide salt is KDN.

13. The method as claimed in claim 12, wherein said initial compound is the potassium salt of the sulfamic acid.

14. A method of preparing dinitramidic acid, comprising providing an initial compound selected from the group consisting of $NH_2NO_2$, $NH_4NH_2CO_2$, $NH_2SO_3H$, $NH(SO_3H)_2$, $N(SO_3H)_3$, reaction products of ammonia and sulphur trioxide, and salts thereof with metal, ammonium and organic cations;

reacting said initial compound with a nitrating acid mixture selected from the group consisting of nitric acid/sulphuric acid ($NHO_3/H_2SO_4$), nitric acid/oleum ($HNO_3/H_2SO_4/SO_3$), nitric acid/sulphur trioxide ($HNO_3/SO_3$), nitric acid/perchloric acid ($HNO_3/HClO_4$), nitric acid/phosphoric acid ($HNO_3/H_3PO_4$), nitric acid/diphosphorous pentoxide ($HNO_3/P_2O_5$), nitric acid/acetic acid, nitric acid/acetic anhydride, nitric acid/trifluoroacetic acid and nitric acid/trifluoroacetic anhydride, at a temperature of −25° C. or below, to form dinitramidic acid in the reaction mixture, and diluting said reaction mixture with water after a predetermined time of reaction.

15. The method as claimed in claim 14, wherein said dilution of the reaction mixture is initiated when the concentration of dinitramidic acid in the reaction mixture has reached an optimal level.

16. The method as claimed in claim 14, further comprising measuring the concentration of dinitramidic acid in the reaction mixture during said reaction by UV spectroscopy.

17. In a method of preparing dinitramide salt, wherein dinitramidic acid is neutralized with a neutralizing agent to form the corresponding dinitramide salt and said dinitramide salt is recovered from a mixture of salts formed in said neutralization, the improvement comprising contacting an aqueous solution of said mixture of salts with an adsorbing agent which adsorbs the dinitramide salt, said adsorbing agent being selected from the group consisting of activated carbon, silica gel and zeolites, and desorbing said dinitramide salt from said adsorbing agent with hot water and/or a polar organic solvent.

18. The method as claimed in claim 17, further comprising arranging said adsorbing agent in a column, passing said aqueous solution of the salt mixture through said column, and eluting said dinitramide salt with an elution agent consisting of hot water and/or a polar organic solvent.

19. The method as claimed in claim 18, wherein said dinitramide salt is eluted by gradient elution.

20. The method as claimed in claim 17, wherein said organic solvent is selected from the group consisting of acetone, acetonitrile, 2-propanol and other low carbon alcohols, and mixtures thereof.

21. The method as claimed in claim 17, wherein said neutralizing agent is ammonia, and said dinitramide salt is ADN.

22. The method as claimed in claim 17, wherein said neutralizing agent is KOH, and said dinitramide salt is KDN.

* * * * *